United States Patent
Asai et al.

(10) Patent No.: US 12,170,453 B2
(45) Date of Patent: Dec. 17, 2024

(54) CHARGING STAND

(71) Applicant: BROTHER KOGYO KABUSHIKI KAISHA, Nagoya (JP)

(72) Inventors: Sho Asai, Ama (JP); Yushi Kato, Nagoya (JP); Takehiko Inaba, Chita (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 467 days.

(21) Appl. No.: 17/562,914

(22) Filed: Dec. 27, 2021

(65) Prior Publication Data

US 2022/0209556 A1 Jun. 30, 2022

(30) Foreign Application Priority Data

Dec. 28, 2020 (JP) ................................. 2020-219183

(51) Int. Cl.
*H01M 10/46* (2006.01)
*H02J 7/00* (2006.01)

(52) U.S. Cl.
CPC ........ *H02J 7/0044* (2013.01); *H02J 7/00034* (2020.01); *H02J 7/0013* (2013.01)

(58) Field of Classification Search
CPC ..... H02J 7/00034; H02J 7/0044; H02J 7/0013
USPC .................................. 320/107, 114, 115, 116
See application file for complete search history.

(56) References Cited

U.S. PATENT DOCUMENTS

| | | | |
|---|---|---|---|
| 9,601,934 B2 * | 3/2017 | Ikegami | .............. H02J 7/0042 |
| 2012/0097425 A1 | 4/2012 | Sakai et al. | |
| 2016/0043584 A1 | 2/2016 | Sun | |
| 2016/0377523 A1 * | 12/2016 | Funakoshi | ............ G06F 3/0412 |
| | | | 358/1.6 |
| 2019/0199111 A1 | 6/2019 | Saihara | |
| 2020/0171862 A1 * | 6/2020 | Sanada | .................... B41J 25/34 |

FOREIGN PATENT DOCUMENTS

| | | |
|---|---|---|
| JP | 2005-19924 A | 1/2005 |
| JP | 2007-295677 A | 11/2007 |
| JP | 4119626 B2 * | 7/2008 |

(Continued)

OTHER PUBLICATIONS

Japanese Office Action for the related Japanese Patent Application No. 2020-219183 dated Sep. 27, 2024.

*Primary Examiner* — Edward Tso

(74) *Attorney, Agent, or Firm* — KENEALY VAIDYA LLP

(57) ABSTRACT

A charging stand to which a printing device is capable of being detachably mounted, the charging stand including: a housing having a mounting surface on which the printing device is capable of being detachably mounted and a bottom surface; a first storage part provided on the bottom surface and configured to store an AC adapter; and a first guide part provided on the bottom surface of the housing, the first guide part being configured to allow a power supply cable extending from the AC adapter stored in the first storage part to be inserted therein, and the first guide part being configured to guide the power supply cable to an outer edge of the housing, wherein the first guide part has a bent portion bent at an intermediate portion in an extension direction, the extension direction extending from the first storage part toward the outer edge of the housing.

12 Claims, 5 Drawing Sheets

(56) References Cited

FOREIGN PATENT DOCUMENTS

| | | | |
|---|---|---|---|
| JP | 2012-94631 A | 5/2012 | |
| JP | 2012-147344 A | 8/2012 | |
| JP | 2017-216857 A | 12/2017 | |
| JP | 2018-147099 A | 9/2018 | |
| JP | 2019205267 A * | 11/2019 | |
| WO | WO-2013061732 A1 * | 5/2013 | ............ H02J 7/0027 |
| WO | WO-2017149898 A1 * | 9/2017 | ................ H02J 7/00 |
| WO | 2018/051768 A1 | 3/2018 | |

* cited by examiner

CHARGING STAND

CROSS-REFERENCE TO RELATED APPLICATIONS

This application is based upon and claims the benefit of priority from prior Japanese patent application No. 2020-219183, filed on Dec. 28, 2020, the entire contents of which are incorporated herein by reference.

TECHNICAL FIELD

The present disclosure relates to a charging stand to which a printing device is capable of being mounted and configured to charge a battery embedded in the printing device.

BACKGROUND ART

A charging stand for placing a device having a battery embedded therein and charging the battery is known. For example, a charging stand configured to place an electronic terminal device and to charge a battery in a placed state is disclose by related-art. For the charging of the battery, an AC adapter configured to electrically relay the battery and an AC power supply is used. The charging stand has a storage space for storing the AC adapter, and the storage space is configured to store the AC adapter from a backside of the charging stand. A side surface of the charging stand is provided with an insertion hole. In the insertion hole, a power supply cable extending from the stored AC adapter is inserted. Thereby, the charging stand can store the AC adapter without interference.

According to the charging stand of the related art, when storing the AC adapter, the power supply cable of the AC adapter is inserted into the insertion hole provided on the side surface. In many cases, this type of the AC adapter is configured such that the power supply cable can be detachably mounted thereto, from a standpoint of convenience. In this case, in a state where the AC adapter is stored in the charging stand, for example, if the power supply cable is pulled by mistake, the tension is directly applied to a part of the AC adapter to which the power supply cable is mounted. For this reason, there is a problem that the power supply cable separates from the AC adapter.

SUMMARY

An aspect of the present disclosure provides a charging stand capable of avoiding separation of a power supply cable from an AC adapter in a state where the AC adapter is stored in the charging stand.

According to an aspect of the present disclosure, there is provided a charging stand to which a printing device is capable of being detachably mounted, the charging stand configured to charge a battery embedded in the printing device, the charging stand including: a housing having a mounting surface on which the printing device is capable of being detachably mounted and a bottom surface provided on an opposite side to the mounting surface; a first storage part provided on the bottom surface of the housing and configured to store an AC adapter; and a first guide part provided on the bottom surface of the housing, the first guide part being configured to allow a power supply cable extending from the AC adapter stored in the first storage part to be inserted therein, and the first guide part being configured to guide the power supply cable to an outer edge of the housing, wherein the first guide part has a bent portion bent at an intermediate portion in an extension direction, the extension direction extending from the first storage part toward the outer edge of the housing.

According to the above-described aspect, the AC adapter is used by being stored in the first storage part provided on the backside of the housing. The power supply cable extending from the AC adapter is guided with being inserted in the first guide part and is led to the outer edge of the housing. According to the aspect of the present disclosure, it is possible to facilitate processing of arranging the power supply cable by the first guide part.

The first guide part is bent at the bent portion located at the intermediate portion in the extension direction. According to the aspect of the present disclosure, even when the power supply cable is pulled by mistake, it is possible to avoid separation of the power supply cable from the AC adapter due to friction resistance between the power supply cable and the first guide part at the bent portion.

DESCRIPTION OF EMBODIMENTS

Hereinafter, an embodiment of the present disclosure will be described with reference to the drawings.

Figure 1:
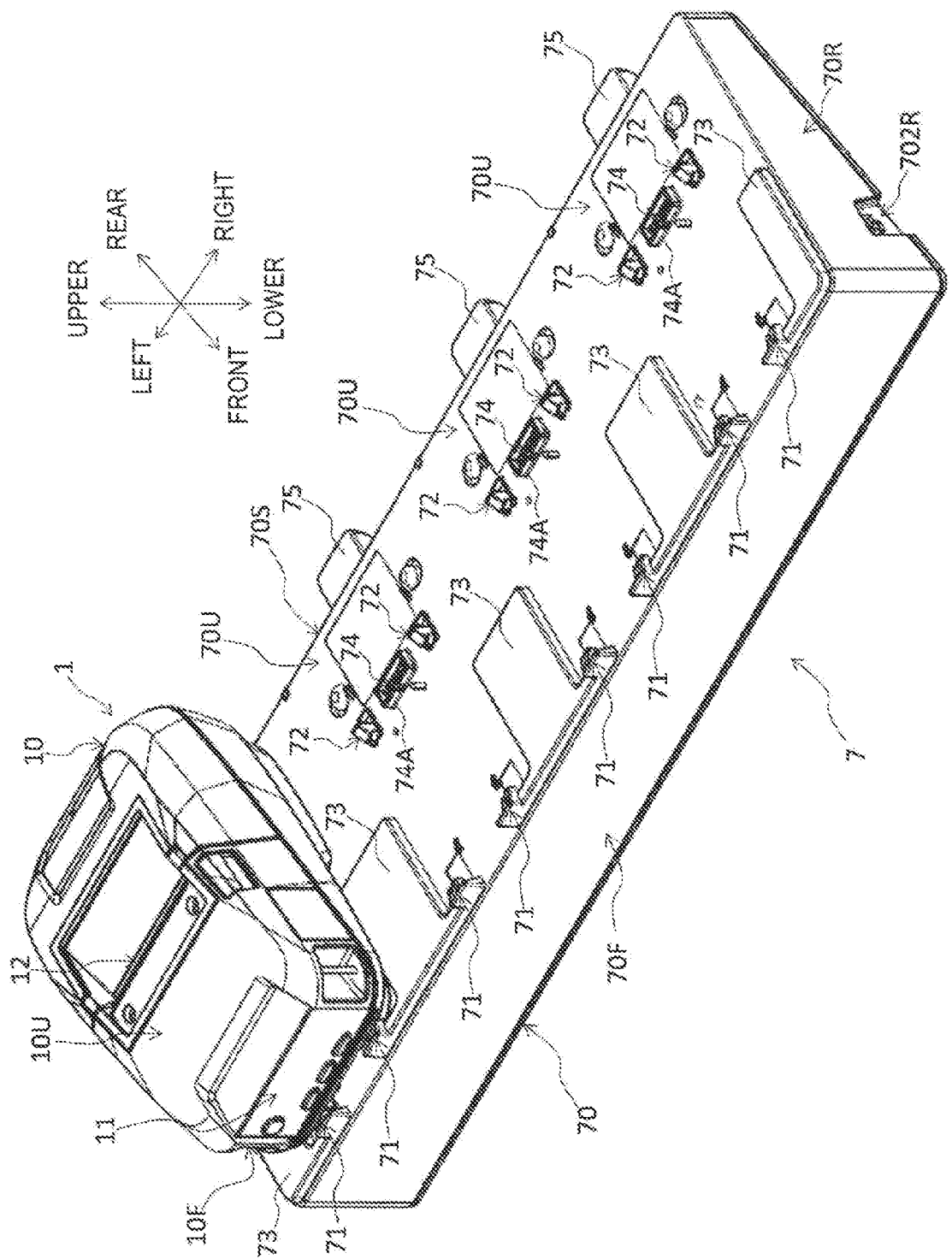
FIG. 1 is a perspective view of a printing device and a charging stand.

As shown in FIG. 1, a printing device 1 is a mobile heat-sensitive printer that can be driven by a battery (not shown). The printing device 1 can connect to an external terminal (not shown) on a communication network via an Ethernet cable 2 (which corresponds to the communication cable), which will be described later. The printing device 1 can print characters such as letters, figures and the like on a heat-sensitive label by causing an internal thermal head to generate heat based on print data received from the external terminal. The external terminal is a general-purpose personal computer (PC). The printing device 1 is carried and used by a user by being mounted to a waist belt via a belt clip (not shown) or by being put on a shoulder via a shoulder belt (not shown). The charging stand 7 is a stationary stand that can detachably mount and hold the printing device 1. The charging stand 7 can align and hold maximum four printing devices 1 in the right and left direction. In a case of using one printing device 1, the printing device 1 may be held on a left end side of the charging stand 7, as shown in FIG. 1. On a mounting surface 70U of the charging stand 7, connection and engaging parts with the printing devices 1 each have substantially the same shapes and arrangements so as to correspond to the four printing devices 1. When the printing device 1 having the battery embedded therein is held on the charging stand 7, the charging stand 7 functions as a charging stand that can charge the battery. In a state where the printing device 1 is held on the charging stand 7, the battery and an AC power supply are relayed by an AC adapter 3, which will be described later, so that the battery is charged. Note that, in description below, the upper and lower direction, the front and rear direction, and the right and left direction correspond to the upper and lower direction, the fore and back direction, and the right and left direction as seen from the user, as shown in each drawing.

<Printing Device>

Figure 4:
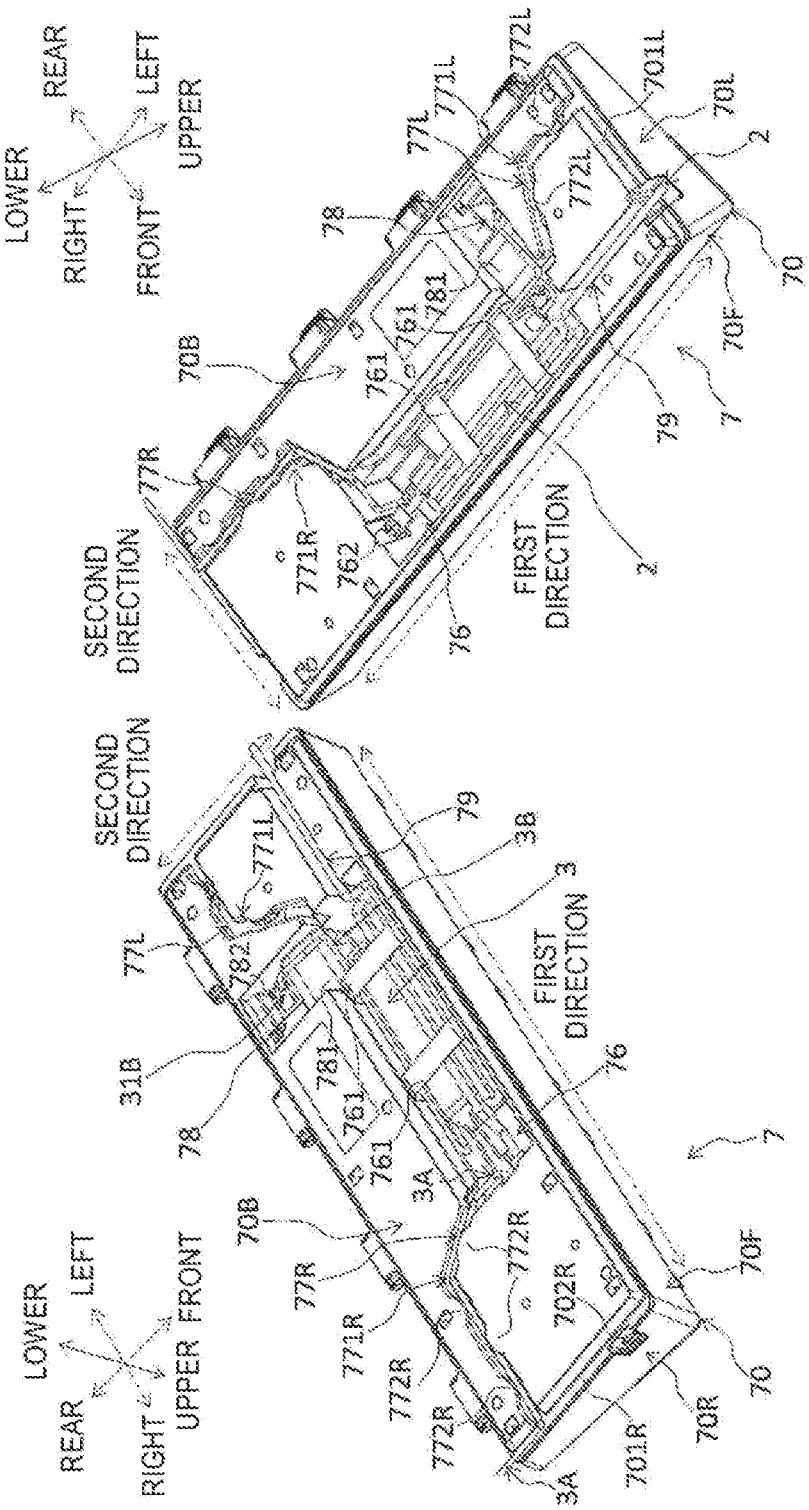
FIGS. 4A and 4B are perspective views of the charging stand, as seen from below, in a state where an AC adapter and an Ethernet cable are stored.

As shown in FIG. 1, the printing device 1 has a printer main body 10 having a substantially cuboid shape. A user interface 11 including an LCD and a plurality of operation buttons is provided at a part of a front surface IOF of the printer main body 10, other than both left and right end portions. An upper surface IOU of the printer main body 10 is provided with a discharge port 12 through which a printed heat-sensitive label is discharged. The printer main body 10 has the battery configured to supply DC electric power embedded therein. The printing device 1 is driven by the DC electric power supplied from the battery, thereby executing a printing operation by an operation on the user interface 11. When the printing device 1 is held on the charging stand 7, the battery can be charged by electric power that is supplied from the charging stand 7. In addition, data is transmitted and received with respect to the printing device 1 held on the charging stand 7 via an Ethernet cable 2 (refer to FIGS. 4A and 4B) connected to the charging stand 7.

A lower surface of the printer main body 10 faces the mounting surface 70U of the charging stand 7. As described later, the mounting surface 70U is provided with engaging tools 71 and 72, guide parts 73 and stand-side terminals 74. On the lower surface of the printer main body 10, concave portions capable of engaging each of the engaging tools 71 and 72 and the guide parts 73 are provided in positions corresponding to the engaging tools 71 and 72 and the guide parts 73. In addition, the lower surface of the printer main body 10 is provided with a device-side terminal in a position corresponding to the stand-side terminal 74. The concave portions and the device-side terminal are engaged with the engaging tools 71 and 72, the guide parts 73 and the stand-side terminal 74, so that the printing device 1 is mounted on the mounting surface 70U. When separating the mounted printing device 1 from the charging stand 7, a lever 75 of the charging stand 7 is operated to release the engagement of the lower surface of the printer main body 10. Thereby, the printing device 1 is separated from the charging stand 7. In this way, the printing device 1 can be detachably mounted to the charging stand 7.

<Charging Stand>

Figure 2:
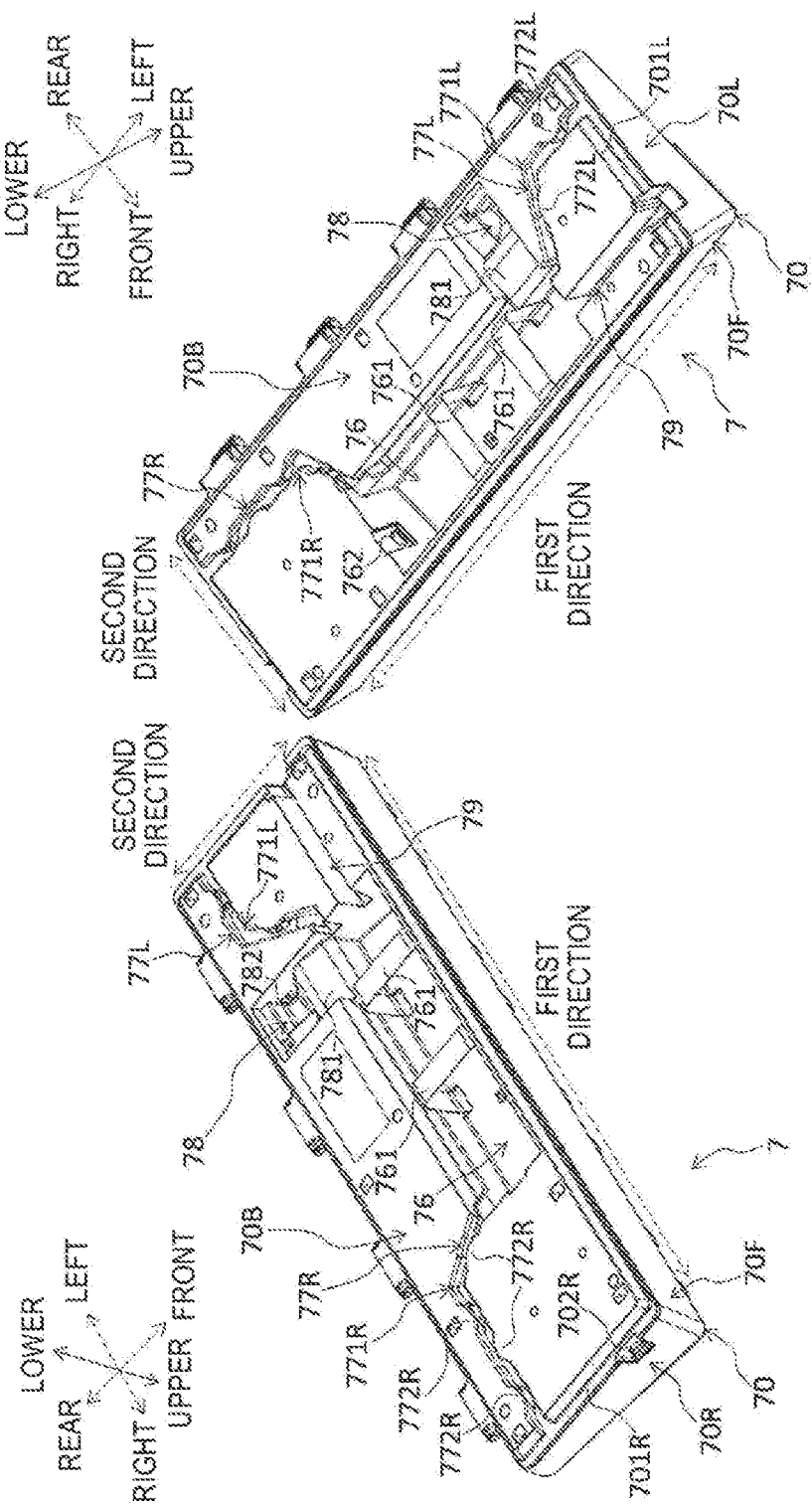
FIGS. 2A and 2B are perspective views of the charging stand according to an embodiment of the present invention, as seen from below.

As shown in FIGS. 1, 2A and 2B, the charging stand 7 has a housing 70 having a substantially cuboid shape. The mounting surface 70U for mounting the printing device 1 is provided on an upper surface of the housing 70. The mounting surface 70U has a substantially rectangular shape and is inclined relative to a horizontal surface by a predetermined angle. Specifically, the mounting surface 70U is inclined so that a height of a front surface 70F of the housing 70 is higher than a height of a rear surface 70S of the housing 70. The printing device 1 is mounted on a rear upper side of the mounting surface 70U inclined in this way.

As shown in FIG. 1, the two fixed engaging tools 71 are aligned in the right and left direction at a front end of the mounting surface 70U for one printing device 1. For one printing device 1, the two movable engaging tools 72 are aligned in the right and left direction at a substantially central portion of the mounting surface 70U in the front and rear direction. The engaging tools 71 and 72 each have a hook shape protruding substantially upward from the mounting surface 70U. The guide part 73 extends rearward from the front end of the mounting surface 70U along the inclination of the mounting surface 70U. The guide part 73 is a convex part having a substantially cuboid shape and protruding substantially upward from the mounting surface 70U. The engaging tools 71 and 72 and the guide parts 73 are each configured to be engageable with the concave portions on the lower surface of the printer main body 10. When mounting the printing device 1 on the mounting surface 70U, the guide part 73 allows the printing device 1 to slide thereon and guides forward the printing device 1 along the mounting surface 70U while engaging with the printing device 1. Then, the printing device 1 is engaged by the engaging tools 71 and 72. In addition, a lower end portion of the engaging tool 72 is supported to be movable in the front and rear direction along the mounting surface 70U in the housing 70. The engaging tool 72 is urged forward by a spring (not shown) provided in the housing 70. When separating the mounted printing device 1, the lever 75 is operated to move rearward the engaging tool 72 against an urging force of the spring, thereby releasing the engagement.

As shown in FIG. 1, the stand-side terminal 74 is provided at a portion that is a substantially central portion of the mounting surface 70U corresponding to one printing device 1 and is between the engaging tools 72. The stand-side terminal 74 includes two types of electrode groups. To the first electrode group, a signal S for data communication is transmitted in a state where the Ethernet cable 2 is connected to the charging stand 7 (refer to FIGS. 4A and 4B). To the second electrode group, a voltage V for battery charging is applied in a state where the AC adapter 3 is connected to the charging stand 7 (refer to FIGS. 4A and 4B). A wall portion 74A has a plate shape, and extends substantially upward from a position of the mounting surface 70U surrounding the stand-side terminal 74. A portion of a front end portion of the wall portion 74A is cut to form an opening portion. When mounting the printing device 1 on the mounting surface 70U, the device-side terminal of the printing device 1 and the stand-side terminal 74 of the charging stand 7 are engaged to each other via the wall portion 74A. When the printing device 1 is mounted on the mounting surface 70U in a state where the Ethernet cable 2 and the AC adapter 3 are connected to the charging stand 7, the signal S is transmitted to the printing device 1 and the voltage V is applied to the battery of the printing device 1 via the stand-side terminal 74 and the device-side terminal. In this way, when the printing device 1 is mounted on the mounting surface 70U, the battery of the printing device 1 is charged and data is transmitted and received with respect to the printing device 1.

Figure 3:
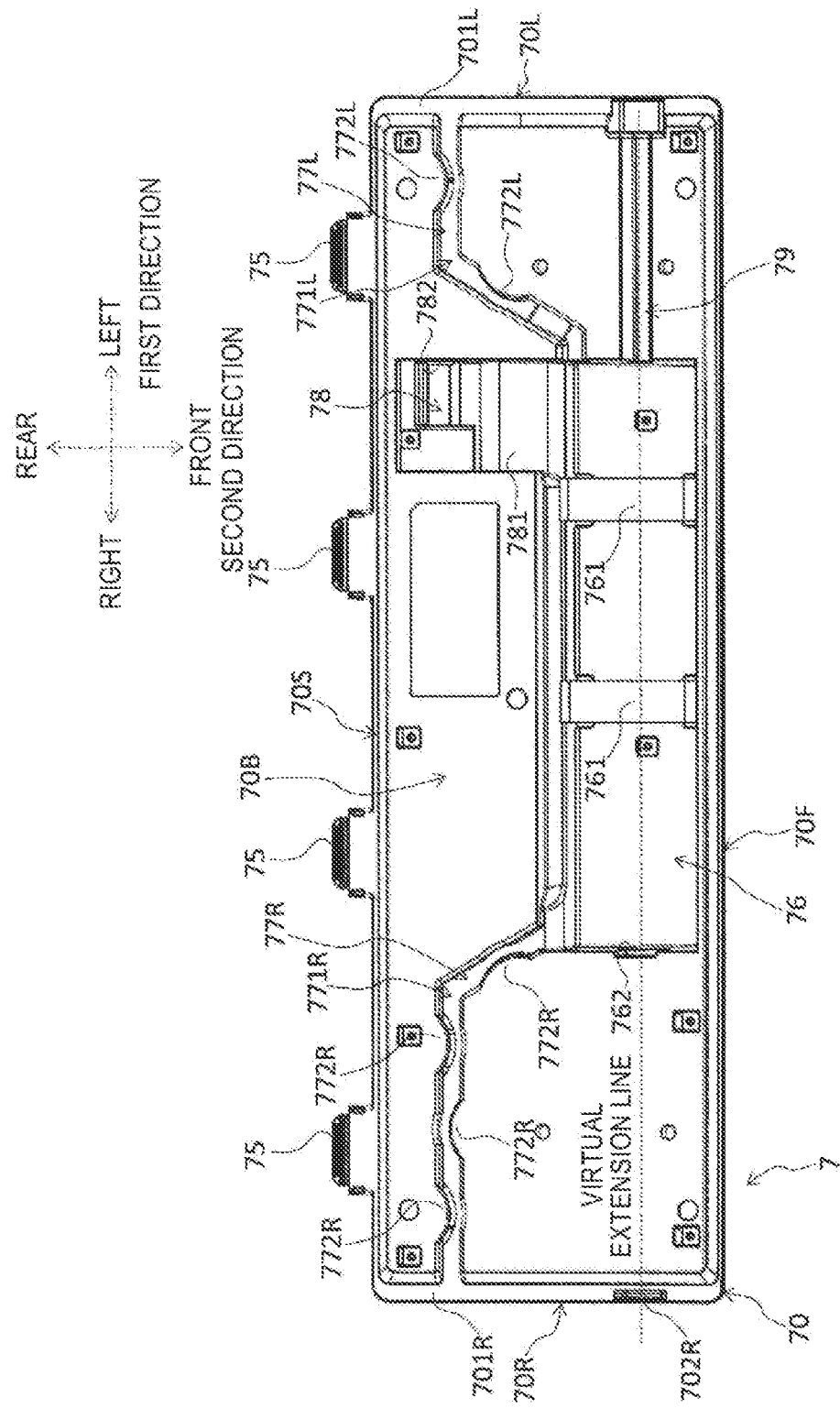
FIG. 3 is a bottom view of the charging stand.

As shown in FIGS. 2A, 2B and 3, a bottom surface 70B of the housing 70 is a surface opposite to the mounting surface 70U for the printing device 1, and has a substantially rectangular shape. For the housing 70, a first direction and a second direction are defined. The first direction is a length direction of the housing 70 and corresponds to the right and left direction in the drawings. The second direction is a direction orthogonal to the first direction and is a direction along the bottom surface 70B. The second direction corresponds to the front and rear direction in the drawings.

A first storage part 76 is provided at a part on a front side in the second direction, which is a substantially central part of the bottom surface 70B in the first direction. The first storage part 76 is a concave part that is concave upward. An internal shape of the concave part has a substantially cuboid shape. The first storage part 76 is provided so that a length direction thereof is along the first direction. The first storage part 76 can store the Ethernet cable 2 and the AC adapter 3. The first storage part 76 is provided with tape-shaped surface fasteners 761 (which corresponds to the fixing member). The two surface fasteners 761 are aligned with a space therebetween in the right and left direction in the first storage part 76. The surface fasteners 761 can wind and fix the Ethernet cable 2 and the AC adapter 3 stored in the first storage part 76 (refer to FIGS. 4 and 4B).

As shown in FIG. 2A, the bottom surface 70B is provided with a first guide groove 77R (which corresponds to the first guide part) that extends from the first storage part 76 toward a right side surface 70R of an outer edge of the housing 70. A left end of the first guide groove 77R connects to a corner portion on a right rear side of the first storage part 76. A right end (outer end) of the first guide groove 77R connects to a step concave portion 701R located on a rear side of the right side surface 70R in the second direction and provided on an inner side of the right side surface 70R. The first guide groove 77R has a bent portion 771R provided at an intermediate portion in an extension direction extending from the left end toward the right end. The first guide groove 77R extends from the left end connected to the first storage part 76 to the bent portion 771R toward the right rear side, and extends rightward from the bent portion 771R to the right end connected to the step concave portion 701R. Specifically, the first guide groove 77R extends from the first storage part 76 toward the right side in the first direction via the bent portion 771R. The first guide groove 77R is a groove part that is concave upward, and a power supply cable 3A extending from the AC adapter 3 stored in the first storage part 76 can be inserted in the first guide groove 77R. When the power supply cable 3A is inserted, the first guide groove 77R guides the power supply cable 3A to the right side surface 70R of the housing 70 (refer to FIGS. 4A and 4B). A groove width of the first guide groove 77R is slightly greater than a line width of the power supply cable 3A. The first guide groove 77R is provided with a plurality of protruding portions 772R (corresponds to the locking portion) protruding in a direction to narrow the groove width. The protruding portion 772R can lock the power supply cable 3A so that the power supply cable 3A inserted in the first guide groove 77R is not separated.

As shown in FIG. 2A, the bottom surface 70B is provided with a step concave portion 701R extending in the second direction and provided in a position on a more inner side than the right side surface 70R of the outer edge of the housing 70. The step concave portion 701R is a concave portion that is concave upward, and a step is formed with respect to the bottom surface 70B. The right end of the first guide groove 77R connects to the step concave portion 701R. When the power supply cable 3A is inserted in the first guide groove 77R, the step concave portion 701R guides the power supply cable 3A extending from the right end of the first guide groove 77R along the second direction (refer to FIGS. 4A and 4B).

As shown in FIG. 2B, the bottom surface 70B is provided with a first guide groove 77L (which corresponds to the first guide part) that extends from the first storage part 76 toward a left side surface 70L of the outer edge of the housing 70. A right end of the first guide groove 77L connects to a corner portion on a left rear side of the first storage part 76. A left end (outer end) of the first guide groove 77L connects to a step concave portion 701L located on a rear side of the left side surface 70L in the second direction and provided on an inner side of the left side surface 70L. The first guide groove 77L has a bent portion 771L provided at an intermediate portion in an extension direction extending from the right end toward the left end. The first guide groove 77L extends from the right end connected to the first storage part 76 to the bent portion 771L toward the left rear side, and extends leftward from the bent portion 771L to the left end connected to the step concave portion 701L. Specifically, the first guide groove 77L extends from the first storage part 76 toward the left side in the first direction via the bent portion 771L. The first guide groove 77L is a groove part that is concave upward, and the power supply cable 3A extending from the AC adapter 3 stored in the first storage part 76 can be inserted in the first guide groove 77L. When the power supply cable 3A is inserted, the first guide groove 77L guides the power supply cable 3A to the left side surface 70L of the housing 70. A groove width of the first guide groove 77L is slightly greater than the line width of the power supply cable 3A. The first guide groove 77L is provided with a plurality of protruding portions 772L (corresponds to the engaging portion) protruding in a direction to narrow the groove width. The protruding portion 772L can lock the power supply cable 3A so that the power supply cable 3A inserted in the first guide groove 77L is not separated. A user may insert the power supply cable 3A into one of the first guide grooves 77R and 77L, depending on a type of use.

As shown in FIG. 2B, the bottom surface 70B is provided with a step concave portion 701L extending in the second direction and provided in a position on a more inner side than the left side surface 70L of the outer edge of the housing 70. The step concave portion 701L is a concave portion that is concave upward, and a step is formed with respect to the bottom surface 70B. The left end of the first guide groove 77L connects to the step concave portion 701L. When the power supply cable 3A is inserted in the first guide groove 77L, the step concave portion 701L guides the power supply cable 3A extending from the left end, along the second direction.

The bottom surface 70B is provided with a second storage part 78 at a part on a rear side in the second direction of the first storage part 76. The second storage part 78 is a concave part that is concave upward. An internal shape of the concave part of the second storage part 78 is smaller than the internal shape of the concave part of the first storage part 76. The second storage part 78 is formed to communicate with a portion of the first storage part 76. The second storage part 78 and the first storage part 76 are formed to communicate with each other by a communication concave portion 781. The communication concave portion 781 is configured to guide a DC cable 3B, which extends from the AC adapter 3, from the first storage part 76 to the second storage part 78. As shown in FIG. 2A, a wall surface on a left side in the first direction of the concave part of the second storage part 78 is provided with a connector 782. A plug 31B at a tip end of the DC cable 3B can be connected to the connector 782 (refer to FIG. 4A). In addition, the connector 782 is electrically connected to the second terminal group for battery charging of the stand-side terminal 74 on the mounting surface 70U.

As shown in FIG. 2B, a wall surface on a right side in the first direction of the concave part of the first storage part 76 is provided with a first port 762. The first port 762 can connect to an insertion connector of the Ethernet cable 2 (refer to FIG. 4B). The first port 762 is electrically connected to the first terminal group for data communication of the stand-side terminal 74 on the mounting surface 70U, in the housing 70.

The bottom surface 70B is provided with a second guide groove 79 extending from the first storage part 76 toward the left side surface 70L of the outer edge of the housing 70. A right end of the second guide groove 79 connects to a left side of the first storage part 76 in the first direction. As shown in FIG. 2B, a left end of the second guide groove 79 is located at a part on a front side of the left side surface 70L in the second direction. The second guide groove 79 extends in a substantially linear shape from the first storage part 76 toward the left in the first direction. The second guide groove 79 is a groove part that is concave upward, and the Ethernet cable 2 connected to the first port 762 can be inserted therein. When the Ethernet cable 2 is inserted, the second guide groove 79 guides the Ethernet cable 2 to the left side surface 70L of the housing 70 (refer to FIGS. 4A and 4B). As shown in FIG. 3, when a virtual extension line extending in the first direction through a center of the second guide groove 79 is defined, the first port 762 is located on the virtual extension line.

As shown in FIG. 2A, the right side surface 70R on the right side of the housing 70 in the first direction is provided with a second port 702R. As shown in FIG. 3, the second port 702R is located on the virtual extension line of the second guide groove 79 on a further right side than the first port 762 in the first direction. To the second port 702R, the insertion connector of the Ethernet cable 2 extending from the left side surface 70L (outer end of the second guide groove 79) of another charging stand 7 can be connected. The second port 702R is electrically connected to the first port 762, in the housing 70.

<Method of Storing AC Adapter and Ethernet Cable>

Figure 5:
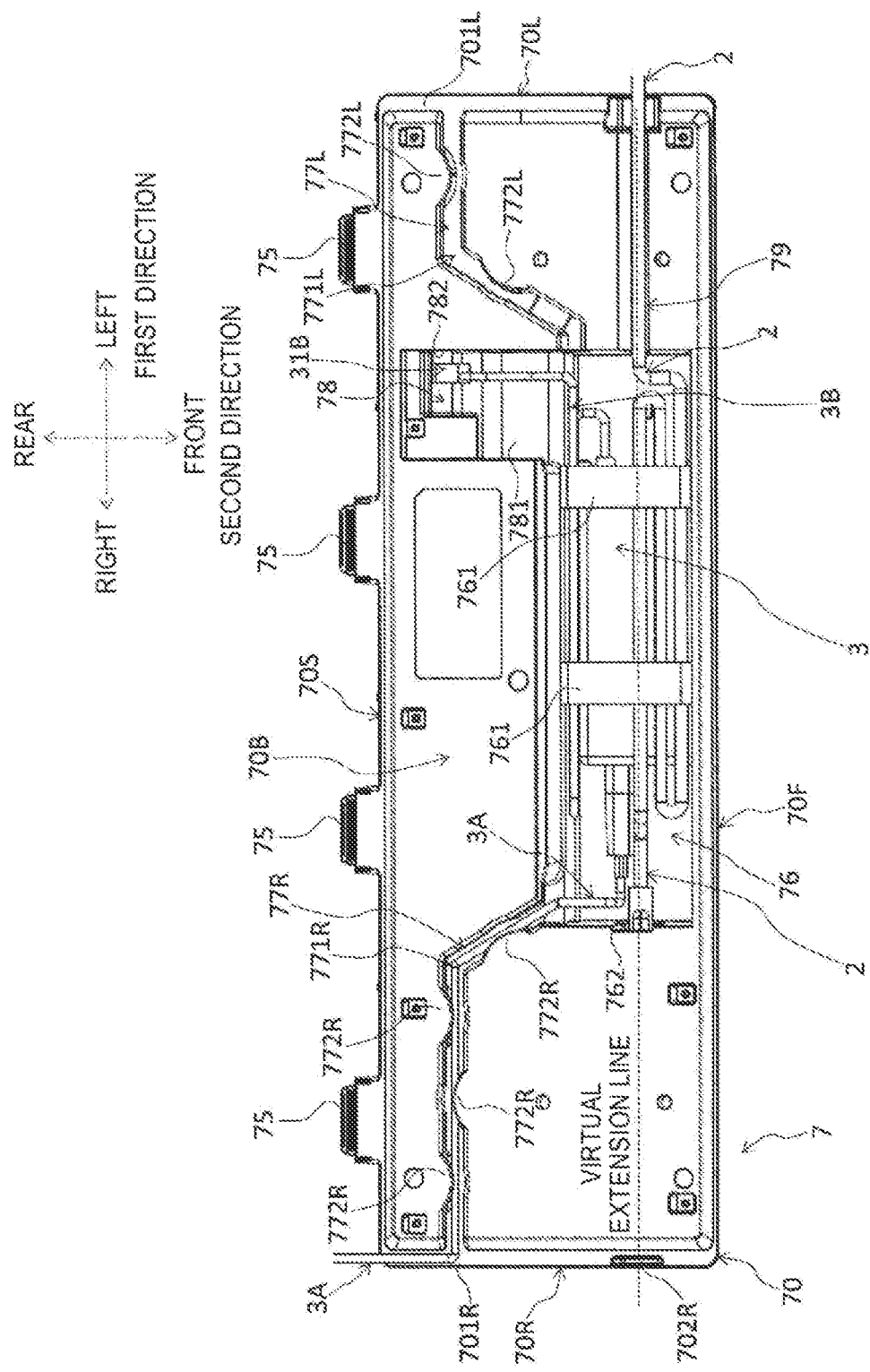
FIG. 5 is a bottom view of the charging stand, in the state where the AC adapter and the Ethernet cable are stored.

As shown in FIGS. 4A and 5, the AC adapter 3 is placed in the first storage part 76 of the bottom surface 70B of the charging stand 7. At this time, the power supply cable 3A and the DC cable 3B each extend rightward and leftward from the AC adapter 3 in the first direction. The power supply cable 3A is inserted from the left end to the right end of the first guide groove 77R via the bent portion 771R and is guided to the right side surface 70R that is an outer edge of the housing 70. The power supply cable 3A inserted in the first guide groove 77R is locked by the protruding portions 772R. The power supply cable 3A extending from the right end of the first guide groove 77R is guided along the rear side in the second direction by the step concave portion 701R.

As shown in FIGS. 4B and 5, the insertion connector of the Ethernet cable 2 is connected to the first port 762 of the first storage part 76. The Ethernet cable 2 is inserted from the right end to the left end of the second guide groove 79 and is guided to the left side surface 70L that is an outer edge of the housing 70. In a space within the first storage part 76, which is empty when the AC adapter 3 is placed, the Ethernet cable 2 is folded and bundled so that an extra length part can be stored. In the first storage part 76, the AC adapter 3 and the Ethernet cable 2 whose extra length part is folded and bundled are wound with the surface fasteners 761 and are thus integrally fixed.

After the AC adapter 3 is fixed, the DC cable 3B is guided to the communication concave portion 781 connected to the first storage part 76, so that the plug 31B reaches the second storage part 78, as shown in FIGS. 4A and 5. The plug 31B is connected to the connector 782 of the second storage part 78.

In this way, the AC adapter 3 and the extra length part of the Ethernet cable 2 are stored in the charging stand 7. The AC adapter 3 and the Ethernet cable 2 are connected to the charging stand 7, so that the voltage V and the signal S reach the electrode group of the stand-side terminal 74 on the mounting surface 70U. Therefore, when the printing device 1 is mounted to the charging stand 7, the battery of the printing device 1 is charged and data is transmitted and received with respect to the printing device 1.

Note that, although the power supply cable 3A is inserted into the first guide groove 77R and is guided to the right side surface 70R, the power supply cable 3A may be instead inserted into the first guide groove 77L and may be guided to the left side surface 70L.

<Effects of Embodiment>

As described above, according to the charging stand 7 of the present embodiment, the AC adapter 3 is used by being stored in the first storage part 76 provided on the bottom surface 70B of the housing 70. The power supply cable 3A extending from the AC adapter 3 is guided with being inserted in the first guide groove 77R or 77L, and is led to the right side surface 70R or the left side surface 70L of the outer edge of the housing 70. According to the present embodiment, it is possible to facilitate processing of arranging the power supply cable 3A by the first guide grooves 77R and 77L.

The first guide grooves 77R and 77L are each bent at each of the bent portions 771R and 771L, each located at the intermediate portion in the extension direction. According to the present embodiment, even when the power supply cable 3A is pulled by mistake, it is possible to avoid separation of the power supply cable 3A from the AC adapter 3 due to friction resistance between the power supply cable 3A and the first guide grooves 77R and 77L at the bent portions 771R and 771L.

By the above configuration, according to the present embodiment, it is possible to avoid separation of the power supply cable 3A from the AC adapter 3 in the state where the AC adapter 3 is stored in the charging stand 7.

In addition, in the present embodiment, particularly, the first guide grooves 77R and 77L are provided with the protruding portions 772R and 772L. The protruding portions 772R and 772L are provided to protrude in the direction to narrow the groove widths of the first guide grooves 77R and 77L and can lock the inserted power supply cable 3A so as not to separate. According to the present embodiment, since the power supply cable 3A is locked by the protruding portions 772R and 772L, the storage ability of the power supply cable 3A can be improved.

In addition, in the present embodiment, particularly, the two grooves of the first guide groove 77R and the first guide groove 77L are provided as the groove in which the power supply cable 3A is inserted. The first guide groove 77R extends from the first storage part 76 toward the right side in the first direction. The first guide groove 77L extends from the first storage part 76 toward the left side in the first direction. According to the present embodiment, since the two grooves of the first guide grooves 77R and 77L can be used, it is possible to change a drawing direction of the power supply cable 3A, depending on a type of use, so that it is possible to improve the convenience.

Further, in the present embodiment, particularly, the second guide groove 79 capable of guiding the Ethernet cable 2 is provided. The first storage part 76 is provided with the first port 762 to which the Ethernet cable 2 can be connected. The second guide groove 79 is formed to cause the Ethernet cable 2 connected to the first port 762 to extend from the first storage part 76 toward the left side in the first direction, and to guide the Ethernet cable 2 to the left side surface 70L of the outer edge of the housing 70. According to the present embodiment, it is possible to facilitate the processing of arranging the power supply cable 3A by the second guide groove 79.

Further, in the present embodiment, particularly, the first port 762 to which the Ethernet cable 2 is connected is provided on the wall surface of the first storage part 76 on the right side in the first direction. According to the present embodiment, it is possible to cause the Ethernet cable 2 connected to the first port 762 on the wall surface of the first storage part 76 on the right side in the first direction to smoothly extend from the first storage part 76 the left side in the first direction and to guide the Ethernet cable 2 to the left side surface 70L of the outer edge of the housing 70 by the second guide groove 79.

Further, in the present embodiment, particularly, the second port 702R to which the Ethernet cable 2 can be connected is provided. The second port 702R is provided in a position on the virtual extension line of the second guide groove 79, on the right side surface 70R on the right side in the first direction of the housing 70. Here, a case where a plurality of the charging stands 7 is used at the same time is assumed. As an example, in a case where the two charging stands 7 are aligned side by side in the first direction, the insertion connector at the left end of the Ethernet cable 2 guided and led to the outer edge (left side surface 70L) of the housing 70 by the second guide groove 79 of the first charging stand 7 arranged on the right side in the first direction and the second port 702R of the second charging stand 7 arranged on the left side in the first direction can be set in positions in which they face each other in the first direction. In this way, according to the present embodiment, even when the plurality of charging stands 7 is aligned side by side in the first direction and each charging stand 7 is connected by the Ethernet cable 2, the Ethernet cable 2 connecting each charging stand 7 can be wired so as not to be unsightly exposed to an outside of the housing 70.

Further, in the present embodiment, particularly, there are cases where the end portion on the right or left side in the first direction (the right side surface 70R or the left side surface 70L) is in close contact with a wall surface, or another charging stand 7 is in close contact with the end portion on the right or left side in the first direction (the right side surface 70R or the left side surface 70L). In this case, it is difficult to continuously lead the power supply cable 3A, which has been guided to the right side or left side in the first direction via the first guide groove 77R or 77L, from the outer edge of the housing 70 to the right side or left side in the first direction. In the present embodiment, the bottom surface 70B of the housing 70 is provided with the step concave portions 701R and 701L for guiding the power supply cable 3A. The step concave portions 701R and 701L extend in the second direction on the more inner side than the outer edge of the housing 70, and can guide the power supply cable 3A in the second direction. According to the present embodiment, even in the above case, the power supply cable 3A guided to the right side or left side in the first direction by the first guide groove 77R or 77L can be guided in the second direction by the step concave portion 701R or 701L and can be thus smoothly led to the outside of the housing 70.

Further, in the present embodiment, particularly, the second storage part 78 is provided separately from the first storage part 76. The second storage part 78 communicates with a portion of the first storage part 76. The second storage part 78 is provided with the connector 782. The plug 31B at the tip end of the DC cable 3B extending from the AC adapter 3 stored in the first storage part 76 can be connected to the connector 782. In the present embodiment, as compared to a configuration where the connector 782 to which the connector 31B of the DC cable 3B is capable of being connected is provided in the first storage part 76, a relatively large distance from the AC adapter 3 to the connector 782 can be secured and the position of the connector 782 can be easily visually recognized. According to the present embodiment, it is not necessary to bend the DC cable 3B in a sharp curve shape, and it is possible to reduce labors and to avoid damage of the DC cable 3B when wiring and storing the DC cable 3B. Further, according to the present embodiment, after the AC adapter 3 is stored in the first storage part 76, the plug 31B of the DC cable 3B can be connected to the connector 782.

Further, in the present embodiment, particularly, the tape-shaped surface fasteners 761 are provided in the first storage part 76. The surface fasteners 761 can fix the AC adapter 3 or the Ethernet cable 2. According to the present embodiment, since the AC adapter 3 or the Ethernet cable 2 is fixed by the fixing member, the storage ability of the AC adapter 3 or the Ethernet cable 2 in the first storage part 76 can be improved.

<Modified Embodiments>

The present invention is not limited to the above-described embodiment, and can be modified in various manners. In the above embodiment, each of the first guide grooves 77R and 77L is provided with one bent portion 771R or 771L. Instead of this, each of the first guide grooves 77R and 77L may be provided with a plurality of bent portions. Also in this configuration, it is possible to avoid separation of the power supply cable 3A from the AC adapter 3.

In the above embodiment, the bottom surface 70B is provided with the two first guide grooves 77R and 77L, as the first guide part. Instead of this, only one of the first guide grooves 77R and 77L may be provided. According to this configuration, as compared to the configuration where the two first guide grooves 77R and 77L are provided, the degree of design freedom as to arrangement, shape and the like of each part on the bottom surface 70B can be improved.

Further, in the above embodiment, both the Ethernet cable 2 and the AC adapter 3 are fixed by the surface fasteners 761 provided in the first storage part 76. Instead of this, only one of the Ethernet cable 2 and the AC adapter 3 may be fixed by the surface fasteners 761.

Note that, in the above descriptions, when the terms "same", "equivalent", and "different" are used in the context of dimensions or sizes of external appearance, these terms may not necessarily mean "same", "equivalent", and "different", respectively, in a strict sense. Specifically, the terms "same", "equivalent", and "different" allows design-related and production-related tolerance and error to be taken into consideration, and mean "substantially same", "substantially equivalent", and "substantially different", respectively.

Also, other than mentioned above, the above embodiment and methods of each of the modified embodiments may be appropriately combined for use.

Although not specifically exemplified, the present disclosure is put into practice with various changes made within a range not departing from the spirit of the present invention.

What is claimed is:

1. A charging stand to which a printing device is capable of being detachably mounted, the charging stand configured to charge a battery embedded in the printing device, the charging stand comprising:
   a housing having a mounting surface on which the printing device is capable of being detachably mounted and a bottom surface provided on an opposite side to the mounting surface;
   a first storage part provided on the bottom surface of the housing and configured to store an AC adapter; and
   a first guide part provided on the bottom surface of the housing, the first guide part being configured to allow a power supply cable extending from the AC adapter stored in the first storage part to be inserted therein, and the first guide part being configured to guide the power supply cable to an outer edge of the housing, wherein the first guide part has a bent portion bent at an intermediate portion in an extension direction, the extension direction extending from the first storage part toward the outer edge of the housing.

2. The charging stand according to claim 1, wherein the first guide part has at least one locking portion configured to lock the power supply cable inserted in the first guide part.

3. The charging stand according to claim 2, wherein the first guide part has a first guide groove having a groove shape and a groove width, and wherein the locking portion includes a protruding portion protruding in a direction to narrow the groove width of the first guide groove.

4. The charging stand according to claim 3, wherein the housing has a substantially cuboid shape whose length direction is a first direction, wherein the first storage part is arranged at a substantially central part of the housing in the first direction, and wherein the first guide groove extends from the first storage part toward one or both of one side and another side in the first direction.

5. The charging stand according to claim 4, further comprising:

a first port provided in the first storage part, a communication cable for transmitting data to and receiving data from the printing device mounted to the housing being capable of being connected to the first port, and a second guide groove provided on the bottom surface of the housing, the second guide groove being configured to allow the communication cable connected to the first port to extend in a substantially linear shape from the first storage part toward the other side in the first direction, and the second guide groove being configured to guide the communication cable to the outer edge of the housing.

6. The printing device according to claim 5, wherein the first port is provided on a wall surface of the first storage part on the one side in the first direction.

7. The charging stand according to claim 5, further comprising:

a second port provided on a side surface of the housing on the one side in the first direction at a position on a virtual extension line of the second guide groove, a communication cable being capable of being connected to the second port.

8. The charging stand according to claim 5, wherein a fixing member configured to fix at least one of the AC adapter and the communication cable is provided in the first storage part.

9. The charging stand according to claim 4, further comprising:

a step concave portion extending in a second direction intersecting with the first direction, the step concave portion being provided on the bottom surface of the housing, the step concave portion located on a more inner side than the outer edge of the housing, and the step concave portion being configured to guide the power supply cable, wherein an outer end of the first guide groove connects to the step concave portion.

10. The charging stand according to claim 1, further comprising:

a second storage part provided on the bottom surface of the housing and communicating with a portion of the first storage part; and a connector provided in the second storage part, a plug at a tip end of a DC cable extending from the AC adapter being capable of being connected to the connector.

11. The charging stand according to claim 1, wherein a fixing member configured to fix the AC adapter is provided in the first storage part.

12. The charging stand according to claim 1, wherein the bent portion is bent in an obtuse angle.

* * * * *